United States Patent [19]
Koike et al.

[11] Patent Number: 5,760,139
[45] Date of Patent: Jun. 2, 1998

[54] GRADED-REFRACTIVE-INDEX OPTICAL PLASTIC MATERIAL AND METHOD FOR ITS PRODUCTION

[75] Inventors: Yasuhiro Koike; Masaki Naritomi; Hidenobu Murofushi; Norihide Sugiyama, all of Yokohama, Japan

[73] Assignee: Yasuhiro Koike, Kanagawa, Japan

[21] Appl. No.: 659,867

[22] Filed: Jun. 7, 1996

Related U.S. Application Data

[63] Continuation-in-part of Ser. No. 553,547, filed as PCT/JP95/00715, Apr. 12, 1995.

[30] Foreign Application Priority Data

Apr. 18, 1994 [JP] Japan ................................. 6-78828
Jun. 9, 1995 [JP] Japan ................................. 7-143710

[51] Int. Cl.$^6$ ........................................ C08L 27/12
[52] U.S. Cl. ........................................ 525/200; 525/199
[58] Field of Search ........................... 525/200, 199

[56] References Cited

FOREIGN PATENT DOCUMENTS

| | | |
|---|---|---|
| 0298159 | 1/1987 | European Pat. Off. . |
| 0242363 | 10/1987 | European Pat. Off. . |
| 0375178 | 6/1990 | European Pat. Off. . |
| 0424063 | 4/1991 | European Pat. Off. . |
| 0459132 | 6/1991 | European Pat. Off. . |
| 0566746 | 10/1993 | European Pat. Off. . |
| 0568869 | 11/1993 | European Pat. Off. . |
| 0606598 | 7/1996 | European Pat. Off. . |
| 6325798 | 2/1993 | Germany . |

OTHER PUBLICATIONS

Noe et al. Adv. Polyimide Sci. Technol., Proc. Int. Conf. Polyimides, 4th (1993).

*Primary Examiner*—Helen Lee
*Attorney, Agent, or Firm*—Oblon, Spivak, McClelland, Maier & Neustadt, P.C.

[57] ABSTRACT

A graded-refractive-index optical plastic material composed of an amorphous fluoropolymer (a) which substantially has no C-H bond and at least one material (b) which differs from the fluoropolymer (a) in refractive index by at least 0.001, wherein the material (b) is distributed in the fluoropolymer (a) so as to have a concentration gradient in a specific direction.

5 Claims, 1 Drawing Sheet

*FIG. 1*

GRADED-REFRACTIVE-INDEX OPTICAL PLASTIC MATERIAL AND METHOD FOR ITS PRODUCTION

CROSS-REFERENCE TO RELATED APPLICATION

This application is a continuation-in-part of U.S. patent application Ser. No. 08/553,547 filed Dec. 15, 1995 which was filed as International Application No PCT/JP95/00715 on Apr. 12, 1995.

TECHNICAL FIELD

The present invention relates to a graded-refractive-index optical plastic material (hereinafter sometimes referred to as optical plastic material for short) having high transparency and high heat resistance simultaneously, which conventional optical plastics hardly ever attained, and a method for its production.

The optical plastic material of the present invention may be a light transmission medium such as an optical fiber, or a body material of a light transmission medium such as a preform of an optical fiber.

A light transmission medium which is the optical plastic material of the present invention is free from light scattering and very transparent to light at wavelengths within a wide range from ultraviolet light to near infrared light, since it is made of an amorphous resin, therefore it is useful for optical systems for light of various wavelengths. In particular, the optical plastic material of the present invention provides a light transmission medium with small losses at wavelength of 1300 nm and 1550 nm, at which a trunk vitreous silica fiber is used in the field of optical communication.

A light transmission medium which is the optical plastic material of the present invention has heat resistance, chemical resistance, humidity resistance and nonflammability enough to withstand severe use conditions, for example, in an engine room of an automobile.

A light transmission medium which is the optical plastic material of the present invention is useful as various graded-refractive-index light transmission medium such as a graded-refractive-index optical fiber, a rod lens, an optical waveguide, an optical decoupler, a wavelength multiplexer, a wavelength demultiplexer, an optical attenuator, a light switch, an optical isolator, a light transmitting module, an light receiving module, a coupler, an optical deflector and an optical integrated circuit. Graded-refractive-index means a region wherein the refractive index of a light transmission medium varies continuously in a specific direction. For example, a graded-refractive-index optical fiber shows a refractive index profile that the refractive index parabolically decreases from the center of the fiber along the radii.

When the optical plastic material of the present invention is a body material of a light transmission medium, it is spun, for example, by hot drawing to prepare a light transmission medium such as a graded-refractive-index optical fiber.

BACKGROUND ART

Heretofore, as resins for graded-refractive-index plastic light transmission medium, optical plastics represented by methyl methacrylate resins, tetrafluoroethylene resins disclosed in WO94/04949 and vinyl fluoride resins have been proposed.

With respect to stepped-refractive-index plastic optical fibers, many proposals have been made to use optical plastics such as a methyl methacrylate resin, a styrene resin, a carbonate resin and a norbornene resin for a core and a fluoropolymer cladding. Japanese Unexamined Patent Publication No. 244007/1990 proposes use of a fluoropolymer core and a fluoropolymer cladding.

The present invention provides an optical plastic material having heat resistance, humidity resistance, chemical resistance and nonflammability required for applications to an automobile, an office automation (OA) equipment, an electrical appliance and the like, which light transmission medium made of a methyl methacrylate resin or a norbornene resin have never attained.

Further, the object of the present invention is to provide a novel optical plastic material which is useful for ultraviolet light (wavelength from 200 nm to 400 nm) and near infrared light (wavelength from 700 nm to 2500 nm), which are unavailable to light transmission medium made of a methacrylate resin, a carbonate resin and a norbornene resin, and has low light transmission losses in a wide transmission zone and a method of its production.

DISCLOSURE OF INVENTION

The present inventors have conducted extensive researches taking the above-mentioned problems into consideration, and consequently found that a fluoropolymer which substantially has no C-H bond is the most suitable to provide heat resistance, humidity resistance, chemical resistance and nonflammability and eliminate C-H bonds (namely carbon-hydrogen bonds) which absorb near infrared light. The fluoropolymer has C-F bonds (namely carbon-fluorine bonds) instead of C-H bonds.

When a substance is exposed to light, a certain interatomic bond absorbs preferentially light of wavelength resonant with its stretching vibration and deformation vibration. Conventional polymeric materials used for plastic optical fibers are mostly compounds having C-H bonds. Such polymeric materials which basically have C-H bonds show the main absorption bands at a shorter wavelength (3400 nm) in the infrared region, since a hydrogen atom is so light as to easily vibrate. Accordingly, in the near infrared to infrared region (from 600 to 1550 nm), which is the wavelength region of a light source, relatively lower harmonic absorption peaks due to the stretching vibration of C-H bonds appears at intervals and they are greatly responsible for absorption loss.

If hydrogen atoms are substituted with fluorine atoms, these harmonic absorption peaks shift to longer wavelengths, and the amount of absorption in the near infrared region decreases. In the case of a PMMA (polymethyl methacrylate) having C-H bonds, the absorption loss attributable to the C-H bonds is estimated theoretically to be 105 dB/km at a wavelength of 650 nm and at least 10000 dB/km at a wavelength of 1300 nm.

On the contrary, in the case of a material in which hydrogen atoms are substituted with fluorine atoms, there is substantially no absorption loss at a wavelength of 650 nm, and the absorption loss at a wavelength of 1300 nm, which is between the sixth and the seventh overtones, is in the order of 1 dB/km and therefore negligible. For this reason, we propose to use a compound having C-F bonds.

It is also preferred to eliminate functional groups such as a carboxyl group and a carbonyl group which inhibit heat resistance, humidity resistance, chemical resistance and nonflammability. Further, since the presence of a carboxyl group results in absorption of near infrared light, and the presence of a carbonyl group results in absorption of ultraviolet light, it is preferred to eliminate these groups. In addition, in order to reduce a transmission loss due to light scattering, it is important to use an amorphous polymer.

In the case of a stepped-refractive-index optical fiber, multimodal light is propagated in it, by being reflected on the interface between the core and the cladding. Therefore, mode dispersion occurs, and as a result, the transmission zone decreases. However, a graded-refractive-index optical fiber hardly causes mode dispersion, and therefore, the transmission zone increases.

The present inventors found out an optical plastic material composed of an amorphous fluoropolymer which substantially has no C-H bond, especially a fluoropolymer having a cyclic structure on its main chain, and a material which differs from the polymer in refractive index, wherein the concentration of the material shows a gradient in a specific direction and a method of its production for the first time, and achieved the following present inventions (1) to (2).

(1) A graded-refractive-index optical plastic material composed of an amorphous fluoropolymer (a) which substantially has no C-H bond and at least one material (b) which differs from the fluoropolymer (a) in refractive index by at least 0.001, wherein the material (b) is so distributed in the fluoropolymer (a) as to have a concentration gradient in a specific direction.

(2) A method of producing a graded-refractive-index optical plastic material, which comprises melting an amorphous fluoropolymer (a) which substantially has no C-H bond, injecting at least one material (b) which differs from the fluoropolymer (a) in refractive index by at least 0.001, or the fluoropolymer (a) containing the material (b) at the center of the melt of the fluoropolymer (a), and molding the melt while or after diffusing the material (b) to form a region wherein the refractive index varies continuously. Heretofore, a tetrafluoroethylene resin, a perfluoro(ethylene-propylene)resin, a perfluoroalkoxy resin, a vinylidene fluoride resin, an ethylene-tetrafluoroethylene resin, a chlorotrifluoroethylene resin and the like have been widely known as fluoropolymers. However, since these fluoro resins are crystalline and causes light scattering, they are poor in transparency and unfavorable as materials for a plastic light transmission medium.

In contrast to these fluoro resins, amorphous fluoropolymers are free from light scattering due to crystals and therefore, are excellent in transparency. The fluoropolymer (a) of the present invention is by no means limited so long as it is an amorphous fluoropolymer having no C-H bond, however, a fluoropolymer having a cyclic structure on its main chain is preferred. As a fluoropolymer having a cyclic structure on its main chain, fluoropolymers having a fluorine-containing alicyclic structure, a fluorine-containing cyclic imide structure, a fluorine-containing triazine ring structure or a fluorine-containing aromatic ring structure are preferred. Among fluoropolymers having a fluorine-containing alicyclic structure, those having a fluorine-containing alicyclic ether structure are more preferred.

A fluoropolymer having a fluorine-containing alicyclic structure is less likely to undergo orientation of polymer molecules, when hot drawn or melt spun into fibers, as compared with fluoropolymers having a fluorine-containing cyclic imide structure, a fluorine-containing triazine ring structure or a fluorine-containing aromatic ring structure. Consequently, it does not cause light scattering, therefore is a more preferred polymer.

The viscosity of the fluoropolymer (a) in a molten state is preferred to be from 103 to 105 poise at a melt temperature of from 200° C. to 300° C. If the melt viscosity is too high, not only melt spinning is difficult, but also diffusion of the material (b) required for a graded refractive index, hardly takes place, and formation of a graded refractive index is difficult. On the other hand, if the melt-viscosity is too low, there are practical problems. Namely, in the case of use as a light transmission medium in an electronic equipment or an automobile, it becomes soft upon exposure to a high temperature, and the light transmission performance becomes poor.

The number-average molecular weight of the fluoropolymer (a) is preferably from 10,000 to 5,000,000, more preferably from 50,000 to 1,000,000. A too small molecular weight can interfere with heat resistance, and too a large molecular weight makes it difficult to form a graded-refractive-index light transmission medium, such being unfavorable.

As a polymer having a fluorine-containing alicyclic structure, those obtainable by polymerization of a monomer having a fluorine-containing cyclic structure, and a polymer having a fluorine-containing alicyclic structure on its main chain which is obtainable by cyclic polymerization of a fluorine-containing monomer having at least two polymerizable double bonds are preferred.

Polymers having a fluorine-containing alicyclic structure on their main chains which are obtainable by polymerization of monomers having a fluorine-containing alicyclic structure are reported by Japanese Examined Patent Publication No. 18964/1988 and the like. Namely, polymers having a fluorine-containing alicyclic structure or their main chains are obtained by homopolymerization of a monomer having a fluorine-containing alicyclic structure such as perfluoro(2,2-dimethyl-1,3-dioxole), or by polymerization of such a monomer with a radical polymerizable monomer such as tetrafluoroethylene, chlorotrifluoroethylene and perfluoro(methyl vinyl ether).

Further, polymers having a fluorine-containing alicyclic structure on their main chains which are obtainable by cyclic polymerization of a fluorine-containing monomer having at least two polymerizable double bonds are reported by Japanese Unexamined Patent Publication No. 238111/1988, Japanese Unexamined Patent Publication No. 238115/1988 and the like. Namely, polymers having a fluorine-containing alicyclic structure on their main chains are obtained by cyclic polymerization of a monomer such as perfluoro(allyl vinyl ether) and perfluoro(butenyl vinyl ether), or copolymerization of such a monomer with a radical polymerizable monomer such as tetrafluoroethylene, chlorotrifluoroethylene and perfluoro(methyl vinyl ether).

Polymers having a fluorine-containing alicyclic structure on their main chains are also obtained by copolymerization of a monomer having a fluorine-containing alicyclic structure such as perfluoro(2,2-dimethyl-1,3-dioxole) with a fluorine-containing monomer having at least two polymerizable double bonds such as perfluoro(allyl vinyl ether) and perfluoro(butenyl vinyl ether).

As examples of the above-mentioned polymer having a fluorine-containing alicyclic structure, those having a repeating unit selected from the following formulae (I) to (IV), those having a repeating unit selected from the following formula (I) to (IV) and a repeating unit of the following formula (V) are mentioned. Part of the fluorine atoms in such polymers having fluorine-containing alicyclic structure may be substituted with chlorine atoms for the purpose of increase in refractive index.

(I)

(II)

(III)

(IV)

$+CF_2CFX_3+$ (V)

[in the above formulae (I) to (V), l is from 0 to 5, m is from 0 to 4, n is from 0 to 1, l+m+n is from 1 to 6, each of o, p and q is from 0 to 5, o+p+q is from 1 to 6, R is F or $CF_3$, $R_1$ is F or $CF_3$, $R_2$ is F or $CF_3$, $X_1$ is F or Cl, $X_2$ is F or Cl and $X_3$ is F or Cl].

As the polymer having a fluorine-containing alicyclic structure, polymers having a cyclic structure on their main chains are preferred. Those containing a polymeric unit having a cyclic structure in an amount of at least 20 mol %, preferably at least 40 mol % are preferred in view of transparency and mechanical properties.

A fluorine-containing polyether used in the present invention is not specially limited, provided that it is a non-crystalline (amorphous) fluorine-containing polyether which does not have a C-H bond, but in view of a mechanical strength and a heat resistance, preferable examples include a fluorine-containing aliphatic polyether having a number average molecular weight of at least 100,000 or a fluorine-containing aromatic polyether having a $\phi f$-O- structural unit ($\phi f$: aromatic ring, all hydrogen atoms of which are substituted with fluorine atoms). Particularly preferable examples include a perfluoropolyether having a structural unit of the following formula (VI) and/or (VII) and having a chain extended by a triazine ring structure.

(VI)

(VII)

Generally, since it is difficult to high-molecularize a perfluoropolyether, a perfluoropolyether having a number average molecular weight of several thousands is liquid-like or grease-like, but it is possible to increase the number average molecular weight of the polyether to from several ten thousands to several hundred thousands by extending a chain by using a terminal functional group and it is also possible to make a resinous polymer by appropriately selecting the chain-extended part. Particularly, it is preferable for the present invention to use a perfluoropolyether having a triazine ring as a chain-extended part, which is known from Japanese Unexamined Patent Publication No. 85328/1992, since it has no C-H bond not only in the main chain but also in the chain-extended part.

A fluorine-containing polyether has preferably a number average molecular weight of from 10,000 to 5,000,000, more preferably from 50,000 to 1,000,000. If the molecular weight is too small, satisfactory mechanical strength and heat resistance can not be obtained, and if the molecular weight is too large, it is difficult to form a light transmission medium having a satisfactory refractive index distribution.

A fluorine-containing aromatic polyester used in the present invention is not specially limited, provided that it is a non-crystalline (amorphous) fluorine-containing aromatic polyester having substantially no C-H bond, but preferable examples include a fluorine-containing aromatic polyester having a structural unit of the following formula (VIII) or (IX). Also, a fluorine-containing aromatic polycarbonate used in the present invention is not specially limited, provided that it is a non-crystalline (amorphous) fluorine-containing aromatic polycarbonate having substantially no C-H bond, but preferable examples include a fluorine-containing aromatic polycarbonate having a structural unit of the following formula (X).

(VIII)

(IX)

(X)

In the above formulas, $R^1$ and $R^2$ may be respectively the same or different, and are selected from the group consisting of:

wherein Rf may be respectively the same or different, and is selected from the group consisting of a fluorine atom, a perfluoroalkyl group, a perfluoroaryl group, a perfluoroalkoxysilyl group and a perfluorophenoxy group, and Y is selected from the group consisting of:

-continued

$+SR'f)_r$, $+R'fS)_r$, $+SR'fS)_r$, $+SR'fO)_r$ and $+OR'fS)_r$ wherein R'f may be respectively the same or different, and is selected from a group consisting of a perfluoroalkylene group and a perfluoroarylene group, and r is an integer of from 1 to 10.

Also, Y may form a ring with two Rf's by intervening carbon therebetween, the ring of which may be a saturated or unsaturated ring.

Preferable examples of a fluorine-containing polyimide are characterized by having a repeating unit of the following formula (XI). A part of fluorine atoms in a fluorine-containing polymer (a) may be substituted with a chlorine atom in order to raise a refractive index.

(XI)

In the above formula (XI), $R^3$ is selected from the group consisting of:

and $R^4$ is selected from the group consisting of:

wherein Rf may be respectively the same or different, and is selected from the group consisting of a fluorine atom, a perfluoroalkyl group, a perfluoroaryl group, a perfluoroalkoxysilyl group and a perfluorophenoxy group, and Y is selected from the group consisting of:

$-O-$, $-CO-$, $-SO_2-$, $-S-$, $-R'f-$, $+OR'f)_r$, $+R'fO)_r$, $+OR'fO)_r$, $+SR'f)_r$, $+R'fS)_r$, $+SR'fS)_r$, $+SR'fO)_r$ and $+OR'fS)_r$ wherein R'f may be respectively the same or different, and is selected from the group consisting of a perfluoroalkylene group and a perfluoroarylene group, and r is an integer of from 1 to 10.

Also, Y may form a ring with two Rf's by intervening carbon therebetween, and may be a saturated or unsaturated ring.

A method for preparing a fluorine-containing polyimide is not specially limited, but may be, for example, a method which comprises reacting an aromatic tetracarboxylic acid (all hydrogen atoms of which are substituted with fluorine atoms) such as perfluoropyromellitic anhydride with an aromatic diamine (all hydrogen atoms of which are substituted with fluorine atoms) such as perfluoro p,p'-diaminodiphenylether to form a polyamide acid and then heating the polyamide acid to form a fluorine-containing polyimide.

The material (b) is at least one material which differs from the fluoropolymer (a) in refractive index by at least 0.001. It may have a higher refractive index or a lower refractive index than the fluoropolymer (a). In optical fibers, it is usual to use a material having a higher refractive index than the fluoropolymer (a).

As the material (b), low-molecular weight compounds, oligomers and polymers containing an aromatic ring such as a benzene ring, a halogen atom such as chlorine, bromine or iodine, or a bonding group such as an ether bond are preferred. Further, the material (b) is a material which substantially has no C-H bond for the same reason as the fluoropolymer (a). The difference in refractive index between the fluoropolymer (a) and the material (b) is preferably at least 0.005.

The oligomeric or polymeric material (b) may be an oligomer or a polymer of such a monomer constituting the fluoropolymer (a) as described above, which differs from the fluoropolymer (a) in refractive index by at least 0.001. Such a monomer is selected from those which form a polymer which differs from the fluoropolymer (a) in refractive index by at least 0.001. For example, it is possible to use two kinds of fluoropolymers (a) having different refractive indices and distribute one polymer (a) in the other polymer (a), as the material (b).

The material (b) preferably has a solubility parameter within $7(cal/cm^3)^{1/2}$ of that of the matrix. A solubility parameter is a property value which is a measure of the miscibility between materials. The solubility parameter $\delta$ is represented by the formula $\delta=(E/V)^{1/2}$, wherein E is the cohesive energy of a molecule of material, and V is the molar volume.

As a low-molecular weight compound, halogenated aromatic hydrocarbons having no hydrogen atom bonded to a carbon atom may be mentioned. Halogenated aromatic hydrocarbons containing only fluorine atoms as halogen atoms, and halogenated aromatic hydrocarbons containing a fluorine atom and another halogen atom are preferred in view of the miscibility with the fluoropolymer (a). Among such halogenated aromatic hydrocarbons, those having no functional group such as a carbonyl group or a cyano group are more preferred.

As such a halogenated aromatic hydrocarbon, a compound represented by the formula $\Phi_r$-$Z_b$ [wherein $\Phi_r$ is a b valent fluorinated aromatic ring residue having fluorine atoms substituted for all the hydrogen atoms, and Z is a halogen atom other than fluorine, —Rf, —CO—Rf, —O—Rf or —CN, wherein Rf is a perfluoroalkyl group, a polyfluoroperhaloalkyl group or a monovalent $\Phi_r$, and b is 0 or an integer of at least 1] may, for example, be mentioned. As the aromatic ring, a benzene ring or a naphthalene ring may be mentioned. The carbon number of a perfluoroalkyl group or a polyfluoroperhaloalkyl group as Rf is preferably at most 5. As a halogen atom other than fluorine, a chlorine atom and a bromine atom are preferred.

As specific compounds, for example, 1,3-dibromotetrafluorobenzene, 1,4-dibromotetrafluorobenzene, 2-bromotetrafluorobenzotrifluoride, chloropentafluorobenzene, bromopentafluorobenzene, iodopentafluorobenzene, decafluorobenzophenone, perfluoroacetophenone, perfluorobiphenyl, chloroheptafluoronaphthalene and bromoheptafluoronaphthalene may be mentioned.

As the polymeric or oligomeric material (b) among those having the above-mentioned repeating units (I) to (XI), fluoropolymers having a different refractive index from the fluoropolymer (a) to be used in combination (for example, a combination of a fluoropolymer containing fluorine atoms only as halogen atoms with a fluoropolymer containing fluorine atoms and chlorine atoms, and a combination of two kinds of fluoropolymers obtained by polymerizing at least two monomers of different kinds in different proportions) are preferred.

Further, in addition to the above-mentioned fluoropolymers having a cyclic structure on their main chains, oligomers of monomers containing no hydrogen atom such as tetrafluoroethylene, chlorotrifluoroethylene, dichlorodifluoroethylene, hexafluoropropylene and perfluoroalkyl vinyl ether, and co-oligomers of at least two of these monomers may be used as the material (b). Further, perfluoropolyethers having a structural unit —$CF_2CF(CF_3)O$— or —$(CF_2)_nO$— (wherein n is an integer of from 1 to 3) may be used. The molecular weights of the oligomers are selected within such a range of molecular weight that they are amorphous, and are preferably from 300 to 10,000 in terms of number-average molecular weight. In view of easy diffusion, it is more preferred that the number-average molecular weights are from 300 to 5000.

The particularly preferable material (b) is a chlorotrifluoroethylene oligomer since it is excellently compatible with the fluoropolymer (a), particularly with a fluoropolymer having a cyclic structure on its main chain. By virtue of its good compatibility, it is possible to easily mix the fluoropolymer (a), particularly the fluoropolymer having a cyclic structure on its main chain with a chlorotrifluoroethylene oligomer by hot-melting them at 200° to 300° C. It is also possible to homogeneously mix them by dissolving them in a fluorine-containing solvent and then removing the solvent. The preferred molecular weight of a chlorotrifluoroethylene oligomer is from 500 to 1500 in terms of the number-average molecular weight.

As a particularly preferable combination of a fluorine-containing polymer (a) and a material (b), there is illustrated chlorotrifluoroethylene oligomer having a large refractive index and a satisfactory compatibility with a fluorine-containing polyether. In this case, since a compatibility is satisfactory, a fluorine-containing polyether, particularly a perfluoropolyether having a chain extended by a triazine ring can be easily mixed with chlorotrifluoroethylene oligomer by heat-melting at 200°–300° C. Also, the two components may be uniformly mixed by dissolving the two components in a fluorine-containing solvent and then removing the solvent. A preferable molecular weight of chlorotrifluoroethylene oligomer is a number average molecular weight of from 500 to 1,500.

When a fluorine-containing aromatic polyester or a fluorine-containing aromatic polycarbonate is used as a fluorine-containing polymer (a), a fluorine-containing aromatic polyester or a fluorine-containing aromatic polycarbonate can be used also as a material (b) if it has a refractive index substantially different from that of the former polymer (a), but a fluorine-containing aromatic imide is preferably used since it has a satisfactory compatibility and a high refractive index. Also, a perfluoropolyether triazine having a low refractive index can be used as a material (b), but in such a case, a fluorine-containing aromatic imide and a fluorine-containing polyether triazine, preferably having a number average molecular weight of from 500 to 5,000, are used.

When a fluorine-containing polyimide is used as a fluorine-containing polymer (a), a compound having a high refractive index such as a fluorine-containing aromatic carbonate, a fluorine-containing aromatic ester or a fluorine-containing aromatic polyimide, containing sulfur, bromine or chlorine having a large atomic refraction, is used. Such a material (b) has preferably a number average molecular weight of from 500 to 5,000.

The optical plastic material of the present invention is most preferably a graded-refractive-index optical fiber. In the optical fiber, the material (b) is so distributed in the fluoropolymer (a) as to have a concentration gradient in the direction of from the center to the periphery. Preferably, it is an optical fiber wherein the material (b) is a material having a higher refractive index than the fluoropolymer (a), and the material (b) is so distributed as to have such a concentration gradient that the concentration of the material (b) decreases in the direction of from the center of the optical fiber to the periphery. In some cases, an optical fiber wherein the material (b) is a material having a lower refractive index than the fluoropolymer (a), and the material (b) is so distributed as to have a concentration gradient that the concentration of the material (b) decreases in the direction of from the periphery of the optical fibers the center, is also useful. A light transmission medium such as the former optical fiber is usually produced by arranging the material (b) at the center and diffusing the material (b) toward the periphery. A light transmission medium such as the latter optical fiber is produced by diffusing the material (b) from the periphery toward the center.

A light transmission medium which is the optical plastic material of the present invention has a transmission loss per 100 m of at most 1000 dB at wavelengths of from 700 to 1,600 nm. Particularly, when a fluoropolymer having an alicyclic structure on its main chain is used, it has a transmission loss per 100 m of at most 50 dB. It is quite advantageous that the transmission loss is at such a low level at relatively long wavelengths of from 700 to 1,600 nm. Namely, it has advantages that since it is available to the same wavelength as vitreous silica optical fiber, it can be connected to a vitreous silica optical fiber without any difficulties, and that a cheaper light source can be used as compared with the case of conventional plastic optical fibers which are available only to light at wavelengths shorter than from 700 to 1,600 nm.

In production of the optical plastic material of the present invention, the molding of the resins and the formation of the graded refractive index may be carried out simultaneously or separately. For example, the optical plastic material of the present invention may be so produced by spinning or extrusion molding that a graded refractive index is formed at the same time as formation of a graded refractive index. It is also possible to form a graded refractive index after molding the resins by spinning or extrusion molding. Further, it is possible to produce a preform (body material) having a graded refractive index and then form (for example spin) the preform into an optical plastic material such as an optical fiber. As described above, the optical plastic material of the present invention also means such a preform having a graded refractive index.

As a method of producing the optical plastic material of the present invention, for example, the following methods (1) to (7) may be mentioned. However, the present invention is not limited to these methods. The method (1) is particularly preferred.

(1) A method which comprises melting the fluoropolymer (a), injecting the material (b) or a fluoropolymer (a) containing the material (b) at the center of the melt of the fluoropolymer (a), and then molding the melt while or after diffusing the material (b).

In this case, the material (b) may be injected at the center not only so as to form only one layer but also so as to form multiple layers. The molding is carried out by melt-extrusion, which is suitable for forming a rod-like body material such as a preform of an optical fiber, or by melt-spinnig, which is suitable for forming an optical fiber.

(2) A method which comprises dip-coating the material (b) or the fluoropolymer (a) containing the material (b) on a core formed from the fluoropolymer (a) by melt spinning or drawing.

(3) A method which comprises forming a hollow tube of the fluoropolymer (a) by using a rotating glass tube or the like, filling in the polymer tube with a monomer phase which gives the material (b) or the fluoropolymer (a) which contains the material (b), and then polymerizing the monomer phase while rotating the polymer tube at a low speed.

In the case of interfacial gel polymerization, at the polymerization step, the tube of the fluoropolymer (a) swells up in the monomer phase and forms a gel phase, and the monomer molecules are polymerized while preferentially diffusing in the gel phase.

(4) A method wherein two kinds of monomers with different reactivities, one of which is a monomer which forms the fluoropolymer (a), and the other is a monomer which forms the material (b), are used, and the polymerization reaction is carried out so that the compositional proportion of the resulting fluoropolymer (a) to the resulting material (b) varies continuously in the direction from the periphery to the center.

(5) A method which comprises hot-drawing or melt-extruding a mixture of the fluoropolymer (a) and the material (b) obtained by homogeneously mixing them or by homogeneously mixing them in a solvent and then removing the solvent upon evaporation, into fibers, and then (or immediately after the formation of the fibers) bringing the fibers into contact with an inert gas under heating to evaporate the material (b) from the surface and thereby forming a graded refractive index. Or, a method wherein after the formation of the fibers, the fibers are immersed in a solvent which does not dissolve the fluoropolymer (a) but dissolves the material (b) so as to dissolve out the material (b) from the surface of the fibers so that a graded refractive index is formed.

(6) A method which comprises coating a rod or a fiber of the fluoropolymer (a) with only the material (b) which has a smaller refractive index than the fluoropolymer (a) or with a mixture of the fluoropolymer (a) and the material (b), and then diffusing the material (b) by heating to form a graded refractive index.

(7) A method which comprises mixing a high-refractive-index polymer and a low-refractive-index polymer by hot-melting or in a state of a solution containing a solvent, and diffusing them in each other while (or after) multilayer-excluding in a state that each has a different mixing ratio, to eventually obtain a fiber having a graded refractive index. In this case, the high-refractive-index polymer may be the fluoropolymer (a), and the low-refractive-index polymer may be the material (b). The high-refractive-index polymer is the material (b), and the low-refractive-index polymer is the material (b).

In the present invention, by virtue of the application of an amorphous fluoro resin to various plastic light transmission medium such as a graded-refractive-index optical fiber, a graded-refractive-index optical waveguide and a graded-refractive-index rod lens, it is possible to transmit light ranging from ultraviolet light to near infrared light with a quite low loss.

A graded-refractive-index optical fiber is particularly suitable for optical communication over short distances in spite of its large diameter since it is flexible and it is easy to form branches and junctions or it. However, no practical optical fiber with a low loss has been proposed so far. The present invention provides a practical optical fiber with a low loss for optical communication over short distances.

The light transmission medium of the present invention provides a plastic light transmission medium having heat resistance, chemical resistance, humidity resistance and nonflammability enough to withstand severe use conditions in an engine room of an automobile, an OA equipment, a plant and an electrical appliance. The graded-refractive-index optical plastic material of the present invention can be used not only as an optical fiber but also as a flat or rod lens. In such a case, by increasing or decreasing the refractive index from the center to the periphery, it can function as a convex lens or a concave lens.

BEST MODE FOR CARRYING OUT THE INVENTION

The present invention will be described in detail with reference to Examples. However, it should be understood that the present invention is by no means restricted to such specific Examples.

SYNTHESIS EXAMPLE 1

35 g of perfluoro(butenyl vinyl ether) [PBVE], 5 g of 1,1,2-trichlorotrifluoroethane (R113), 150 g of deionized water and 90 mg of $((CH_3)_2CHOCOO)_2$ as a polymerization initiator, were put in a pressure glass autoclave of an internal volume of 200 ml. The atmosphere in the autoclave was replaced by nitrogen three times, and suspension polymerization was conducted at 40° C. for 22 hours, yielding 28 g of a polymer having a number-average molecular weight of about $1.5 \times 10^5$ (hereinafter referred to as polymer A).

Figure 1:
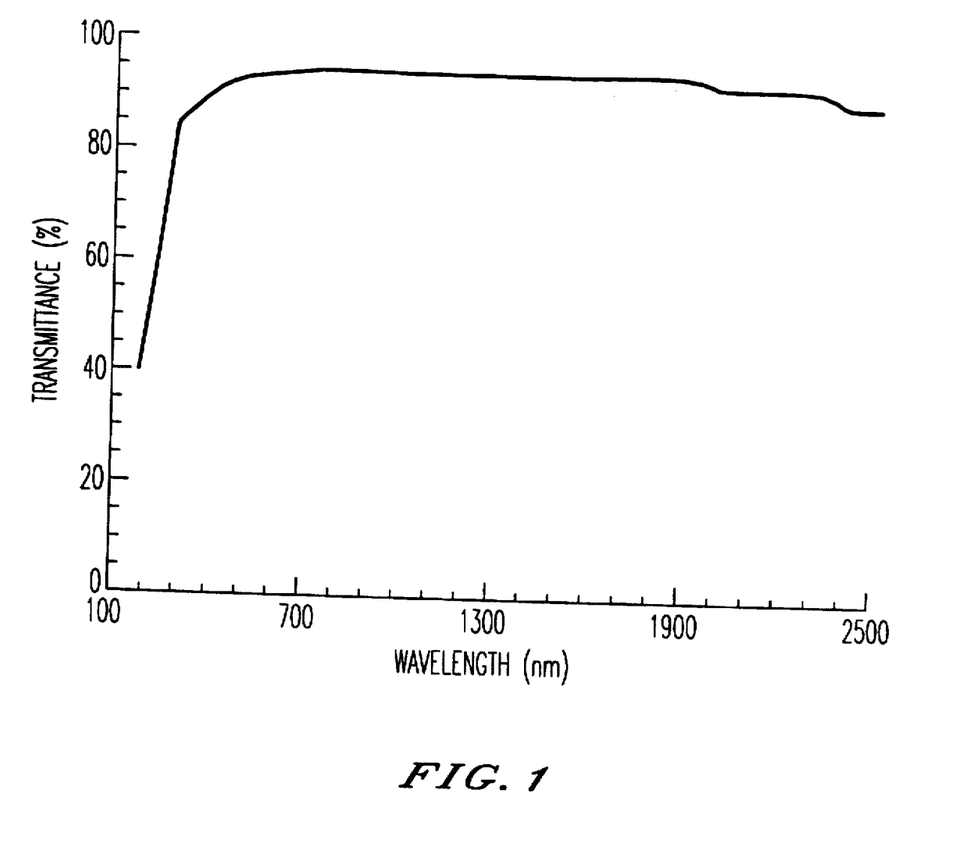
FIG. 1 is the transmittance of polymer A.

The intrinsic viscosity [η] of polymer A, measured in perfluoro(2-butyltetrahydrofuran) [PBTHF] at 30° C., was 0.50. The glass transition point of polymer A was 108° C., and it was a tough, transparent and glassy polymer. The 10% thermal decomposition temperature was 465° C., the solubility parameter was 5.3 cal/cm$^3$, and the refractive index was 1.34. FIG. 1 illustrates the transmittance of polymer A.

SYNTHESIS EXAMPLE 2

Perfluoro(2,2-dimethyl-1,3-dioxole) [PDD] and tetrafluoroethylene in the weight ratio of 80:20 were radical polymerized, and thereby a polymer having a glass transition point of 160° C. and a number-average molecular weight of about $5 \times 10^5$ (hereinafter referred to as polymer B) was obtained. Polymer B was colorless and transparent, and had a refractive index of 1.3 and a high transmittance.

PDD and chlorotrifluoroethylene (CTFE) in the weight ratio of 75:25 were radical polymerized, and thereby a polymer having a glass transition point of 150° C. and a number-average molecular weight of about $3 \times 10^5$ (hereinafter referred to as polymer C) was obtained. Polymer C was colorless and transparent, and had a refractive index of 1.4 and a high transmittance.

SYNTHESIS EXAMPLE 3

8 g of PBVE, 2 g of PDD, 10 g of PBTHF and 20 mg of $((CH_3)_2CHOCOO)_2$ as a polymerization initiator were put in a pressure glass ampoule of an internal volume of 50 ml. The atmosphere in the ampoule was replaced by nitrogen three times, and polymerization was conducted at 40° C. for 20 hours, yielding 6.7 g of a transparent polymer having a number-average molecular weight of about $2 \times 10^5$ (hereinafter referred to as polymer D).

The glass transition point of polymer D was 157° C., the refractive index was 1.32, and the content of PDD polymeric unit determined by measuring the absorbance at 1930 cm$^{-1}$ on the IR spectrum, was 12 wt %.

2 g of PBVE, 8 g of PDD, 10 g PBTHF and 20 mg of $((CH_3)_2CHOCOO)_2$ as a polymerization initiator, were put in a pressure glass ampoule of an internal volume of 50 ml. The ampoule was freeze-degassed three times, and then polymerization was conducted at 30° C. for 20 hours. Thereby, 7 g of a transparent polymer having a number-average molecular weight of about $3 \times 10^5$ (hereinafter referred to as polymer E) was obtained.

The glass transition point of polymer E was 210° C., the refractive index was 1.29, the content of PDD polymeric unit determined by measuring the absorbance at 1930 cm$^{-1}$ on the IR spectrum, was 82 wt %.

EXAMPLE 1

Polymer A obtained by the above Synthesis was dissolved in PBTHF solvent, and then 12 wt % of 1,3-dibromotetrafluorobenzene (DBTFB), which had a refractive index of 1.52 and was different from polymer A in solubility parameter by 3.2 cal/cm$^3$, was added to obtain a mixed solution. From the solution, the solvent was removed, to obtain a transparent mixed polymer (hereinafter referred to as polymer F).

Polymer A was melted, and melt-spinning was conducted at 300° C. while the melt of polymer F was injected at the center of the melt of polymer A, thereby an optical fiber having a refractive index gradually decreasing in the direction of from the center to the periphery, was obtained.

The light transmission property of the optical fiber thus obtained was 300 dB/km at 780 nm, and 130 dB/km at 1550 nm. The optical fiber was confirmed to be capable of transmitting light ranging from visible light to near infrared light satisfactorily.

EXAMPLE 2

40 g of PBVE and 500 ml of $((CH_3)_2CHOCOO)_2$ as a polymerization initiator were introduced into glass tube. After the tube was freeze-degassed, polymerization was conducted while the glass tube was rotated at a high speed. The hollow tube thus synthesized was removed from the glass tube to obtain a tube of a polymer having a number-average molecular weight of about $1 \times 10^5$. The tube was charged with 20 g of PBVE, 2 g of DBTFB as a high-refractive-index material and 200 ml of $((CH_3)_2CHOCOO)_2$ as a polymerization initiator, and then sealed, and polymerization was conducted while the tube was rotated at a low speed.

At the polymerization step, the polymer of the tube swells up in the monomer phase, forming a gel phase. The polymerization in the gel phase is promoted by the gel effect, and the polymer phase is formed from the periphery. At this time, the monomer molecules preferentially diffuse in the gel phase since monomer molecules are smaller in size than molecules of the high-refractive-index material, and the polymerization proceeds with the high refractive index material concentrated at the center, to form such a graded refractive index that the refractive index gradually decreases from the center to the periphery. The preform thus obtained as hot-drawn to obtain a graded-refractive-index optical fiber.

The light transmission property of the optical fiber thus obtained was 500 dB/km at 650 nm, and 150 dB/km at 1550 nm. The optical fiber was confirmed to be capable of transmitting light ranging from visible light to near infrared light satisfactorily.

EXAMPLE 3

A core of 30μ was prepared from polymer D obtained in the above Synthesis. On the other hand, a solution containing polymer D at a concentration of 1 wt % in PBTHF solvent (hereinafter referred to as solution D) was prepared. Similarly, a solution containing 1 wt % of polymer E in PBTHF solvent (hereinafter referred to as solution E) was prepared. Solution D was dip-coated on the core of polymer D at a drawing rate of 6 cm, and then dried at 180° C. It was found that the diameter of the core of polymer D increased by 100 nm.

Dip coating and drying were repeated 500 times while adding a 1/250 portion by weight of solution E to the solution D each time. Finally, solution E at a concentration of 10 wt % was dip-coated and dried repeatedly five times, and it was dried at 180° C. for 2 hours. Thereby, an optical fiber having a diameter of about 600μ wherein the refractive index gradually decreased in a direction of from the core to the periphery, was obtained.

The light transmission property of the optical fiber thus obtained was 1050 dB/km at 650 nm, 460 dB/km at 950 nm, and 130 dB/km at 1300 nm. The optical fiber was confirmed to be capable of transmitting light ranging from visible light to near infrared light satisfactorily.

EXAMPLE 4

Equal weights of polymer B and polymer C synthesized above were dissolved in PBTHF solvent and mixed. From the resulting solution, the solvent was removed to obtain a transparent polymer mixture (B+C). A melt of polymer mixture (B+C) was poured inside a melt of polymer B, and further a melt of polymer C was injected at the center, while being melt spun, to obtain an optical fiber which has a refractive index gradually decreasing from the center to the periphery.

The light transmission property of the optical fiber thus obtained was 550 dB/km at 650 nm, and 130 dB/km at 1550 nm. The optical fiber was confirmed to be capable of transmitting light ranging from visible light to near infrared light satisfactorily.

EXAMPLE 5

An optical fiber was obtained in the same manner as in Example 1 except that 30 wt % of a CTFE oligomer having a number-average molecular weight of 800 was used instead of 12 wt % of DBTFB. The refractive index of the oligomer was 1.41, and the difference in solubility parameter between the oligomer and the polymer A was 1.4 cal/cm$^3$. The optical fiber thus obtained had such a refractive index as decreased gradually from the center to the periphery.

The light transmission property of the optical fiber was 280 dB/km at 780 nm, and 120 dB/km at 1550 nm. The optical fiber was confirmed to be capable of transmitting light ranging from visible light to near infrared light satisfactorily.

EXAMPLE 6

50 Parts of PDD having a reactivity ratio $r^1$ (the ratio of the rate of production of PDD homopolymer to the ratio of production of PDD/PBVE copolymer) of 1.9, 50 parts of PBVE having a reactivity ratio $r^2$ (the ratio of the rate of production of PBVE homopolymer to the ratio of production of PDD/PBVE copolymer) of 0.19, and 1 part of dialkoxy-acetophenone as a photoinitiator, dissolved in 5 parts of HCFC25, were introduced in a glass ampoule. After the ampoule was freeze-degassed three times, photopolymerization was conducted by using a low-pressure mercury lamp. Thereby, a preform having a graded refractive index with a refractive index at the periphery of 1.31 and a refractive index at the center of 1.33, was obtained. It was hot-drawn to obtain a graded-refractive-index optical fiber.

The light transmission property of the optical fiber was 320 dB/Km at 650 nm, and 250 dB/Km at 1550 nm. The optical fiber was confirmed to be capable of transmitting light ranging from visible light to ultraviolet light satisfactorily.

EXAMPLE 7

85 Parts of polymer A and 15 parts of DBTFB were melt-mixed and formed into a rod. The rod was hot-drawn at 200° C. to obtain a fiber. At this time, after emerged from the hot drawing region, the fiber was passed through an electric oven of 1 m long at 120° C. In the electric oven, a flow of dry air preliminary heated to 120° C. was made to evaporate DBTFB from the surface of the fiber and thereby obtain an optical fiber having a graded refractive index.

The light transmission property of the optical fiber was 420 dB/km at 650 nm, 250 dB/km at 780 nm, and 110 dB/km at 1300 nm. The optical fiber was confirmed to be capable of transmitting light ranging from visible light to near infrared light satisfactorily.

EXAMPLE 8

90 Parts of PBVE and 10 parts of CTFE were polymerized to obtain a polymer having a number-average molecular weight of about 2×10$^5$ (hereinafter referred to as polymer F). Polymer F was melt-mixed with a CTFE oligomer having a number-average molecular weight of 800 homogeneously, and the melt mixture was formed into a rod containing the oligomer in an amount of 20 wt %.

The rod was hot-drawn into a fiber of 500μ diameter. The fiber was passed through ethanol to dissolve out the CTFE oligomer, and then passed through a cylindrical hot oven at 20° C. with a residence time of about 10 seconds for drying. Thereby, a graded-refractive-index optical fiber with a refractive index at the periphery of 1.36 and a refractive index at the center of 1.38, was obtained.

The light transmission property of the optical fiber thus obtained was 250 dB/Km at 650 nm, and 150 dB/Km at 1550 nm. The optical fiber was confirmed to be capable of transmitting light ranging from visible light to ultraviolet light satisfactorily.

EXAMPLE 9

Polymer C was spun at 270° C. by a extrusion method, and the resulting fiber was immediately passed through a hexafluoropropylene oxide (HFPO) oligomer (number-average molecular weight 2100) heated to 220° C. so that the residence time would be 3 minutes. As a result, the HFPO oligomer diffused and penetrated into the fiber, thereby, an optical fiber having an outer diameter of 600 μ and a refractive index continuously varying in the direction of from the periphery to the center, was obtained. The refractive index at the periphery was 1.34, and the refractive index at the center was 1.35.

The light transmission property of the optical fiber thus obtained was 300 dB/Km at 650 nm, and 130 dB/Km at 1550 nm. The optical fiber was confirmed to be capable of transmitting light ranging from visible light to ultraviolet light satisfactorily.

EXAMPLE 10

A polymer having a PDD content of 20 wt % and a number-average molecular weight of about 1×10$^5$ (hereinafter referred to as polymer G) and a polymer having a PDD content of 60 wt % and a number-average molecular weight of about 5×10$^5$ (hereinafter referred to as polymer H) were synthesized by polymerization of PDD and PBVE. The refractive indices were 1.33 for polymer G and 1.31 for polymer H, respectively.

Polymers G and H were dissolved in perfluorotributylamine/perfluorooctane=20/80 (weight ratio), respectively, so that the polymer concentrations would be 20 wt %. Then, the resulting solutions were mixed in the ratios shown in Table 1 to prepare 11 kinds of solutions, and they were heated to evaporate part of the solvent. Thereby gel solutions of about 3000 cP were obtained. The 11 kinds of gels having different mixing ratios were extruded concentrically by using a multilayer nozzle into a multilayer fiber, while being heated at 80° C. The fiber was passed through a hot oven (about 150° to 200° C.) in which air flow was made to remove the residual solvent. Thereby, a graded-refractive-index fiber was obtained.

The light transmission property of the optical fiber thus obtained was 350 dB/km at 650 nm, 150 dB/km at 950 nm, and 120 dB/km at 1300 nm. The optical fiber was confirmed to be capable of transmitting light ranging from visible light to near infrared light satisfactorily.

COMPARATIVE EXAMPLE

As for a graded-refractive-index plastic optical fiber, the light transmission loss of PMMA was about 400 dB/km at 650 nm, and the transmission losses at wavelengths of 780 nm, 1300 nm and 1550 nm were so large that it was impractical as a light transmission medium.

A stepped-refractive-index plastic optical fiber having a core and a cladding made of fluoro resins is reported to be capable of transmitting light ranging from visible light to near infrared light but has a light transmission loss of about 300 dB/km.

By contrast, the graded-refractive-index transparent fluoro resin optical fiber of the present invention is capable of transmit light ranging from visible light to near infrared light with extremely low losses.

TABLE 1

| Polymer G | Polymer H |
|---|---|
| 100 parts | 0 part |
| 81 | 19 |
| 64 | 36 |
| 49 | 51 |
| 36 | 64 |
| 25 | 75 |
| 16 | 84 |
| 9 | 91 |
| 4 | 96 |
| 1 | 99 |
| 0 | 100 |

SYNTHESIS EXAMPLE 4

2 Parts (0.021 mol) of $FOC(CF_2)_4COF$, 4 parts (0.03 mol) of CsF and 8 parts of diglyme were placed in a stainless autoclave, and were cooled to 0° C. While stirring, 98 parts of hexafluoropropylene oxide was slowly added thereto. After stirring for 3 hours, a temperature was adjusted to room temperature and a fluorocarbon layer was separated. The fluorocarbon layer was then dropwise added to 300 parts of methanol cooled with ice. The lower layer was separated, and 100 parts of dichloropentafluoropropane (R225) was added thereto. Thereafter, ammonia gas was slowly blown thereinto. After distilling off R225, 200 parts of phosphorus pentoxide was added thereto, and the resultant mixture was heated at 150°–200° C. for 5 hours.

After adding 200 parts of R225 to the resultant mixture again, a liquid layer was separated by filtration, and was washed with water and was dehydrated with anhydrous magnesium sulfate. Thereafter, a volatile content was removed by heating at 100° C. under a reduced pressure to obtain polyhexafluoropropylene oxide dinitrile (NC-$(C_3F_6O)_u(CF_2)_6O(C_3F_6O)_vC_2F_4$-CN) having a number average molecular weight of about 2,200. The dinitrile thus obtained was further reacted with polyimidoylamidine to prepare polytriazine in accordance with the method disclosed in Japanese Unexamined Patent Publication No. 85328/1992 in the following manner. In the following reaction formula, Rfo represents $(C_3F_6O)_u(CF_2)_6O(C_3F_6O)_vC_2F_4$. Rf represents $C_3F_7$.

The perfluoropolyethertriazine (hereinafter referred to as polymer J) thus obtained was a tough polymer having a refractive index of 1.35. The intrinsic viscosity of the polymer thus obtained was measured in PBTHF at 30° C., and was found to be 0.51 dl/g.

EXAMPLE 11

Polymer J obtained by the above Synthesis Example 4 was dissolved in PBTHF solvent, and then 12 wt % of 1,3-dibromotetrafluorobenzene (DBTFB), which had a refractive index of 1.52 and was different from polymer J in solubility parameter by 5.5 $(cal/cm^3)^{1/2}$, was added to obtain a mixed solution. From the solution, the solvent was removed, to obtain a transparent mixed polymer (hereinafter referred to as polymer K).

Polymer J was melted, and melt-spinning was conducted at 200° C. while the melt of polymer K was injected at the center of the melt of polymer J, thereby an optical fiber having a refractive index gradually decreasing in the direction of from the center to the periphery, was obtained.

The light transmission property of the optical fiber thus obtained was 380 dB/km at 780 nm, and 250 dB/km at 1550 nm. The optical fiber was confirmed to be capable of transmitting light ranging from visible light to near infrared light satisfactorily.

EXAMPLE 12

Melt-spinning was conducted in such a manner as to distribute polymer K at the center, polymer J as an outer layer and a cyclic polymer of perfluorobutenylvinylether (hereinafter referred to as polymer L) as the outermost layer, thereby an optical fiber having a refractive index gradually decreasing in the direction of from the center polymer K to the outer polymer J layer, was obtained.

The light transmission property of the optical fiber thus obtained was 350 dB/km at 780 nm, and 230 dB/km at 1550 nm. The optical fiber was confirmed to be capable of transmitting light ranging from visible light to near infrared light satisfactorily.

EXAMPLE 13

An optical fiber was obtained in the same manner as in Example 11 except that 20 wt % of a chlorotrifluoroethylene (CTFE) oligomer having a number average molecular weight of 800 was used instead of 12 wt % of DBTFB. The refractive index of the oligomer was 1.41, and the difference in solubility parameter between the oligomer and the polymer J was 2.1 (cal/cm$^3$)$^{1/2}$. The optical fiber thus obtained had such a refractive index as decreased gradually from the center to the periphery.

The light transmission property of the optical fiber was 300 dB/km at 780 nm, and 200 dB/km at 1550 nm. The optical fiber was confirmed to be capable of transmitting light ranging from visible light to near infrared light satisfactorily.

EXAMPLE 14

85 Parts of polymer J and 15 parts of DBTFB were melt-mixed to form a rod. The rod thus formed was heat-stretched at 200° C. to obtain a fiber. The fiber extruded from the heat-stretching device was passed through an electric furnace having a length of 1 m heated at 100° C. In the electric furnace, dry air previously heated to 100° C. was flown to vaporized DBTFB from the surface of the fiber to obtain a graded-refractive-index optical fiber.

The light transmission property of the optical fiber thus obtained was 380 dB/km at 650 nm, 270 dB/km at 780 nm and 170 dB/km at 1300 nm, and the optical fiber was confirmed to be capable of transmitting light ranging from visible light to near infrared light satisfactorily.

EXAMPLE 15

80 Parts of polymer J and 20 parts of TFE oligomer having a number average molecular weight of 800 were melt-mixed at 200° C. to obtain a rod of a mixed polymer.

The rod thus obtained was heat-stretched to form a fiber having a diameter of 500μ. The fiber thus formed was passed through ethanol to elute the CTFE oligomer out, and the resultant fiber was dried by passing through a cylindrical furnace heated at 150° C. for about 10 seconds. As this result, an optical fiber having a refractive index graded from the periphery to the center was obtained.

The light transmission property of the optical fiber thus obtained was 340 dB/km at 650 nm and 200 dB/km at 1550 nm, and the optical fiber was confirmed to be capable of transmitting light ranging from visible light to near infrared light satisfactorily.

EXAMPLE 16

Tetrafluorohydroquinone and tetrafluoroisophthalic acid chloride were reacted by usual method to obtain a fluorine-containing polyester having a number average molecular weight of about 140,000 (hereinafter referred to as polymer M). The polymer M thus obtained was mixed with hexafluorobenzene (HFBZ) and DBTFB of an amount of 15 wt % to the polymer M, and HFBZ was removed to obtain a mixed polymer (hereinafter referred to as polymer N).

Polymer M was melted, and melt-spinning was conducted at 300° C. while the melt of polymer N was injected at the center of the melt of polymer M, thereby an optical fiber having a refractive index gradually decreasing in the direction of from the center to the periphery, was obtained.

The light transmission property of the optical fiber thus obtained was 420 dB/km at 780 nm and 350 dB/km at 1550 nm, and the optical fiber was confirmed to be capable of transmitting light ranging from visible light to near infrared light satisfactorily.

EXAMPLE 17

A fluorine-containing polycarbonate having a number average molecular weight of about 100,000 (hereinafter referred to as polymer O) was synthesized from tetrafluorohydroquinone by phosgene method. The polymer O thus synthesized was mixed with hexafluorobenzene (HFBZ) and an aromatic imide of the following formula in an amount of 18 wt % to polymer O, and HFBZ was removed to obtain a mixed polymer (hereinafter referred to as polymer P).

Thereafter, the polymer P thus obtained was melt-molded to obtain a rod having a diameter of 8 cm and a length of 30 cm. On the other hand, a hollow tube having an outer diameter of 16 cm, an inner diameter of 8 cm and a length of 30 cm was molded from polymer O. The rod of polymer P was inserted into the hollow tube of polymer O, and the resultant composite was covered with a heat-shrinkable tube of tetrafluoroethylene-hexafluoropropylene copolymer (FEP), and was heated at 200° C. to obtain a preformed product. The preformed product thus obtained was heat-stretched at 300° C. to obtain a fiber having a diameter of 0.5 mm. The refractive index distribution of the fiber thus obtained was measured, and the fiber was found to have a refractive index gradually decreasing in the direction of from the center to the periphery.

The light transmission property of the optical fiber thus obtained was 390 dB/km at 780 nm and 280 dB/km at 1550 nm, and the optical fiber was confirmed to be capable of transmitting light ranging from visible light to near infrared light satisfactorily.

EXAMPLE 18

A perfluoropolyimide (hereinafter referred to as polymer Q) was synthesized from 1,4-bis(3,4-dicarboxytrifluorophenoxy) tetrafluorobenzene anhydride and bis(2,3,5,6-tetrafluoro-4-aminophenyl)ether. Polymer Q and N-pentafluorophenyldichloromaleimide in an amount of 15 wt % to polymer Q were dissolved in hexafluoroisopropylalcohol to obtain a solution. Thereafter, hexafluoroisopropylalcohol was distilled off to adjust a viscosity to obtain a mixture of 3×10$^4$ poises at room temperature (hereinafter referred to as mixture R).

On the other hand, polymer Q only was dissolved in hexafluoroisopropylalcohol in the same manner as above to obtain a mixture of 2×10$^4$ poises at room temperature (hereinafter referred to as mixture S). The two mixtures thus obtained were extruded through a double nozzle in such a manner as to obtain a fiber-like extruded product comprising mixture R in the inside and mixture S in the outside. The fiber-like extruded product thus obtained was heated at 50° C., and was passed through a heat zone wherein nitrogen gas is blown therethrough, thereby vaporizing hexafluoroisopropylalcohol and being reeled by a reeling machine. The fiber thus obtained was further dried in vacuum overnight to fully remove hexafluoroisopropylalcohol. As this result, a graded-refractive-index optical fiber having a diameter of 0.5 mm was obtained.

The optical fiber thus obtained does not have a substantial light transmission loss to a light ranging from 650 nm to 1,600 nm. The optical fiber was then stored at 150° C. for 100 hours, but the light transmission loss of the fiber did not substantially change before and after the storing, and the fiber was proved to have a high heat resistance.

We claim:

1. A graded-refractive-index optical plastic material composed of an amorphous fluoropolymer (a) which substantially has no C-H and at least one material (b) which differs from the fluoropolymer (a) in refractive index by at least 0.001, wherein the material (b) is distributed in the fluoropolymer (a) so as to have a concentration gradient in a specific direction and a refractive index that varies continuously in said specific direction, and wherein the fluoropolymer (a) is at least one member selected from the group consisting of a fluorine-containing polyether, a fluorine-containing aromatic polyester, a fluorine-containing aromatic polycarbonate and a fluorine-containing polyimide.

2. The optical plastic material according to claim 1, wherein the fluorine-containing polyether has a structural unit of the following formula (VI) and/or (VII):

—CF$_2$CF(CF$_3$)O— (VI)

—(CF$_2$)$_n$O— (n=1 to 3) (VII).

3. The optical plastic material according to claim 1, wherein the fluorine-containing polyether is a fluorine-containing polyether having a triazine ring structure in the main chain.

4. The optical plastic material according to claim 1, wherein the fluorine-containing aromatic polyester has a structural unit of the following formula (VIII) or (IX), and the fluorine-containing aromatic polycarbonate has a structural unit of the following formula (X):

+OC—R$^1$+ (VIII)
‖
O

+OC—R$^1$—CO—R$^2$+ (IX)
‖    ‖
O    O

+OCOR$^1$+ (X)
‖
O wherein R$^1$ and R$^2$ may be respectively the same or different, and are selected from the group consisting of:

-continued wherein Rf may be respectively the same or different, and is selected from the group consisting of a fluorine atom, a perfluoroalkyl group, a perfluoroaryl group, a perfluoroalkoxysilyl group and a perfluorophenoxy group, and Y is selected from the group consisting of:

—O—, —CO—, —SO$_2$—, —S—, —R'f—,

+OR'f+$_r$, +R'fO+$_r$, +OR'fO+$_r$,

+SR'f+$_r$, +R'fS+$_r$, +SR'fS+$_r$,

+SR'fO+$_r$ and +OR'fS+$_r$ wherein R'f may be respectively the same or different, and is selected from the group consisting of a perfluoroalkylene group and a perfluoroarylene group, and r is an integer of from 1 to 10, and

Y may form a ring with two Rf's by intervening carbon therebetween, the ring of which may be a saturated or unsaturated ring.

5. The optical plastic material according to claim 1, wherein the fluorine-containing polyimide has a structural unit of the following formula (XI):

(XI)

wherein R$^3$ is selected from the group consisting of:

and R⁴ is selected from the group consisting of:

wherein Rf may be respectively the same or different, and is selected from the group consisting of a fluorine atom, a perfluoroalkyl group, a perfluoroaryl group, a perfluoroalkoxysilyl group and a perfluorophenoxy group, and Y is selected from the group consisting of:

$-O-$, $-CO-$, $-SO_2-$, $-S-$, $-R'f-$, $-(OR'f)_r-$, $-(R'fO)_r-$, $-(OR'fO)_r-$, $-(SR'f)_r-$, $-(R'fS)_r-$, $-(SR'fS)_r-$, $-(SR'fO)_r-$ and $-(OR'fS)_r-$ wherein R'f may be respectively the same or different, and is selected from the group consisting of a perfluoroalkylene group and a perfluoroarylene group, and r is an integer of from 1 to 10, and Y may form a ring with two Rf's by intervening carbon therebetween, the ring of which may be a saturated or unsaturated ring.

* * * * *